(12) United States Patent
Tsushima et al.

(10) Patent No.: US 12,385,855 B2
(45) Date of Patent: Aug. 12, 2025

(54) X-RAY IMAGING SYSTEM AND LEARNED MODEL PRODUCTION METHOD

(71) Applicant: Shimadzu Corporation, Kyoto (JP)

(72) Inventors: Hiroaki Tsushima, Kyoto (JP); Ryuji Sawada, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 259 days.

(21) Appl. No.: 18/363,144

(22) Filed: Aug. 1, 2023

(65) Prior Publication Data
US 2024/0068962 A1  Feb. 29, 2024

(30) Foreign Application Priority Data
Aug. 23, 2022  (JP) ................. 2022-132482

(51) Int. Cl.
  *G01N 23/04*  (2018.01)
  *G06T 7/00*  (2017.01)

(52) U.S. Cl.
  CPC .......... *G01N 23/043* (2013.01); *G06T 7/001* (2013.01); *G01N 2223/401* (2013.01); *G01N 2223/6462* (2013.01); *G06T 2207/10121* (2013.01); *G06T 2207/20081* (2013.01)

(58) Field of Classification Search
  CPC ............... G01N 23/04; G01N 23/043; G01N 2223/401; G01N 2223/6462; G06T 7/00; G06T 7/0002; G06T 7/001; G06T 2207/10116; G06T 2207/10121; G06T 2207/20081; G06T 2207/20084; G06T 2207/30152; G03B 42/02
  See application file for complete search history.

(56) References Cited

FOREIGN PATENT DOCUMENTS

WO  2022/070491 A1  4/2022

*Primary Examiner* — Jurie Yun
(74) *Attorney, Agent, or Firm* — Maier & Maier, PLLC

(57) ABSTRACT

An X-ray imaging system is configured to acquire first and second images from a teacher X-ray image including an inspection target. Discrimination information to discriminate at least one of an area of the inspection target in the first and second images, and an area of a defect part is acquired. Machine learning for producing a learned model is performed by using input teacher data sets based on the first and second images, and output teacher data sets based on the discrimination information.

11 Claims, 7 Drawing Sheets

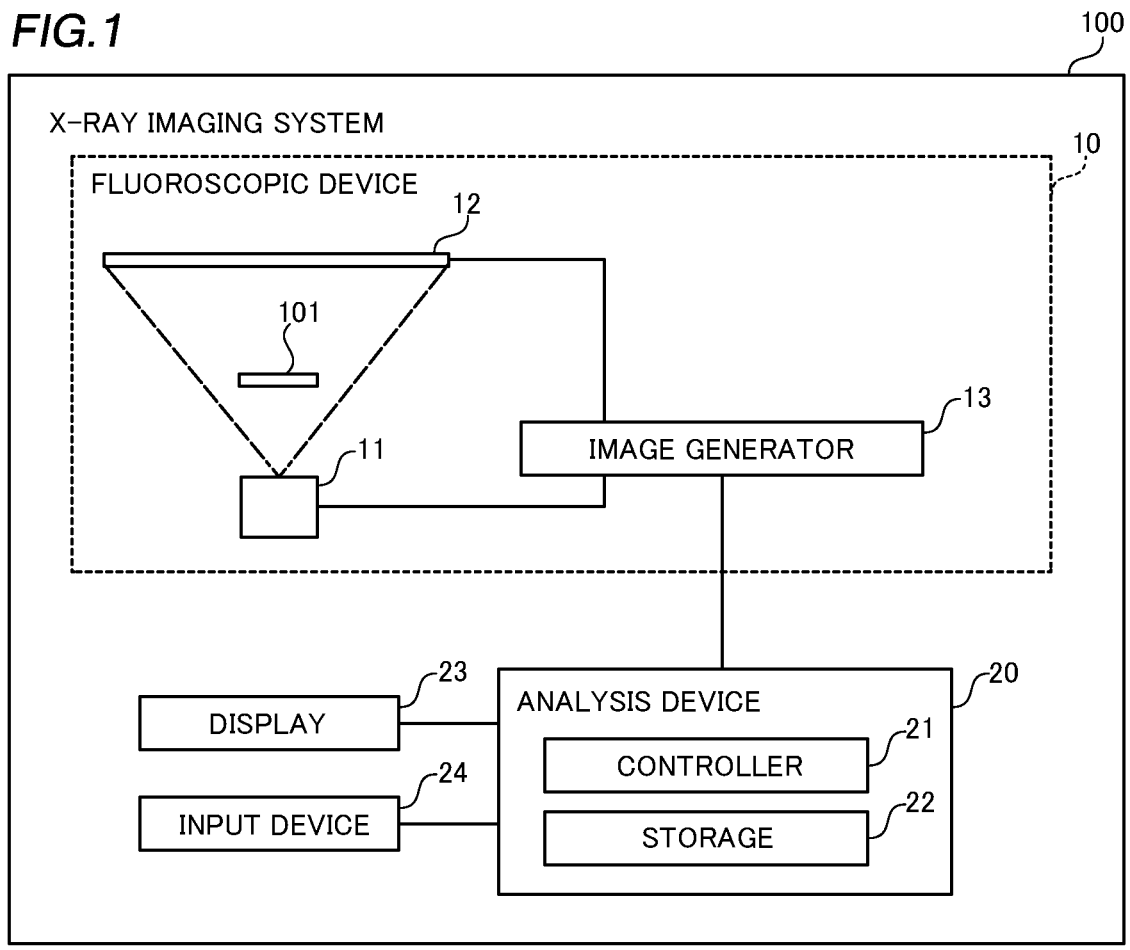
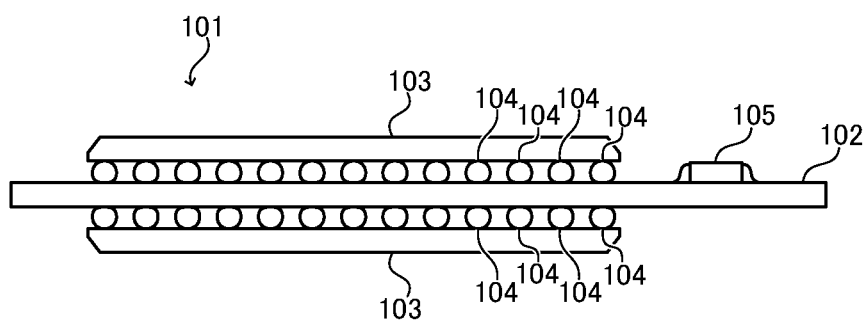

X-RAY IMAGING SYSTEM AND LEARNED MODEL PRODUCTION METHOD

CROSS-REFERENCE TO RELATED APPLICATIONS

The related application number JP2022-132482, an X-ray imaging system and a learned model production method, Aug. 23, 2022, Hiroaki Tsushima, Ryuji Sawada upon which this patent application is based are hereby incorporated by reference.

FIELD

The present invention relates to an X-ray imaging system and a learned model production method, and particularly to an X-ray imaging system and learned model production method capable of producing a learned model.

BACKGROUND

Conventionally, an apparatus producing a learned model is known. Such an apparatus is disclosed in International Publication No. WO 2022-070491, for example.

The above International Publication No. WO 2022-070491 discloses an apparatus (image analyzing device) estimating an area or position of an analysis object in an analysis object image. In the above International Publication No. WO 2022-070491, image analysis using machine learning is used in this estimation. The image analyzing device disclosed in the above International Publication No. WO 2022-070491 produces a learned model performing machine learning using an analysis object image and a label image corresponding to the analysis object image. Analysis is then performed by using the produced learned model. The image analyzing device disclosed in the above International Publication No. WO 2022-070491 entirely applies binarization processing to the analysis object image as an original image so as to convert boundary parts of the analysis object in the image to numerical values, and combines the original image with the processing-applied image in which the boundary parts are converted to numerical values, whereby acquiring the label image.

Although not stated in the above International Publication No. WO 2022-070491, to produce teacher data (label images) used for machine learning, workers (operators) manually select areas in original images (analysis object images) to apply processing to the images in some cases. In such cases, as in the image analyzing device disclosed in the above International Publication No. WO 2022-070491, if operators manually entirely apply processing to a number of original images to produce teacher data, such teacher data production is a burden on the operators. For this reason, in a case in which a learned model to detect at least one of an area of an analysis object (inspection target) and an area of a defect part included in the inspection target is produced, it is desired to reduce such a burden on operators in teacher data production.

SUMMARY

The present invention is intended to solve the above problems, and one object of the present invention is to provide an X-ray imaging system and a learned model production method capable of reducing a burden on operators in teacher data production in a case in which a learned model to detect at least one of an area of an analysis object (inspection target) and an area of a defect part included in the inspection target is produced.

In order to attain the aforementioned object, an X-ray imaging system according to a first aspect of the present invention includes an X-ray emitter configured to emit X-rays to an inspection target having a regular arrangement; an X-ray detector configured to detect the X-rays emitted from the X-ray emitter; an image generator configured to generate an X-ray image based on the X-rays that are detected by the X-ray detector; and a model producer configured to produce a learned model for analysis of the X-ray image generated by the image generator, wherein the model producer includes a cut-out image acquirer configured to acquire a first image that is cut out corresponding to a first part from a teacher X-ray image including the inspection target having a regular arrangement, and a second image that is cut out corresponding to a second part different from the first part from the teacher X-ray image; a discrimination information acquirer configured to acquire discrimination information to discriminate at least one of an area of the inspection target in the first and second images, and an area of a defect part included in the inspection target in the first and second images; and a learning performer configured to perform machine learning for producing a learned model by using input teacher data sets based on the first and second images, and output teacher data sets based on the discrimination information.

A learned model production method according to a second aspect of the present invention includes a step of acquiring a first image that is cut out corresponding to a first part from a teacher X-ray image corresponding to an X-ray image generated by irradiating an inspection target having a regular arrangement with X-rays, and a second image that is cut out corresponding to a second part different from the first part from the teacher X-ray image; a step of acquiring discrimination information to discriminate at least one of an area of the inspection target in the first and second images, and an area of a defect part included in the inspection target in the first and second images; and a step of performing machine learning for producing a learned model for analysis of the X-ray image by using input teacher data sets based on the first and second images, and output teacher data sets based on the discrimination information.

In the X-ray imaging system according to the first aspect and the learned model production method according to the second aspect, a first image that is cut out corresponding to a first part from a teacher X-ray image including the inspection target having a regular arrangement, and a second image that is cut out corresponding to a second part different from the first part from the teacher X-ray image are acquired. Discrimination information to discriminate at least one of an area of the inspection target in the first and second images, and an area of a defect part included in the inspection target is acquired. Accordingly, the acquired discrimination information to discriminate the first image of the teacher X-ray image with the first part being cut out from the teacher X-ray image, and the second image of the teacher X-ray image with the second part being cut out from the teacher X-ray image can reduce a burden on operators of acquiring discrimination information as compared with a case in which operators acquire discrimination information corresponding to the entire teacher X-ray image. As a result, because a burden on operators of acquiring output teacher data to perform machine learning can be reduced, in a case in which a learned model to detect at least one of an area of an inspection target and an area of the defect part included in the inspection target is produced, it is possible to reduce such a burden on operators in teacher data production. Also, in a case in which X-rays are emitted by a point source of light in X-ray imaging, in a generated X-ray image, a central image in an emission center of X-rays and peripheral images in peripheral parts away from the emission center are images corresponding to different incident angle directions of X-rays different from each other. Contrary to this, in the present invention, a first image that is cut out corresponding to a first part from a teacher X-ray image including the inspection target having a regular arrangement, and a second image that is cut out corresponding to a second part different from the first part from the teacher X-ray image are acquired. Because the inspection target in the teacher X-ray image is arranged in a regular arrangement, the images of the inspection target in the first and second images can be projection images corresponding to a structure having a common arrangement relation. Accordingly, the first and second parts including images corresponding to different angle directions of X-rays incident on a structure having a common arrangement relation can be cut out from the teacher X-ray image by acquiring the first and second images. For this reason, even in a case in which not the entire teacher X-ray image but images that are cut out corresponding to parts of the teacher X-ray image are used, teacher data can be acquired to properly represent the entire projection image of the teacher X-ray image, and as a result it is possible to prevent accuracy reduction of discrimination result by the learned model generated by machine learning. Therefore, a burden on operators in teacher data production for producing a learned model can be reduced by using the first and second imaged cut out from the teacher X-ray image while accuracy reduction of discrimination result by the learned model generated by machine learning is prevented.

BRIEF DESCRIPTION OF THE DRAWINGS

FIG. 1 is a block diagram showing the overall configuration of an X-ray imaging system according to one embodiment of the present invention.

FIG. 2 is a schematic diagram showing arrangement of a subject including solder balls.

DETAILED DESCRIPTION

Figure 3:
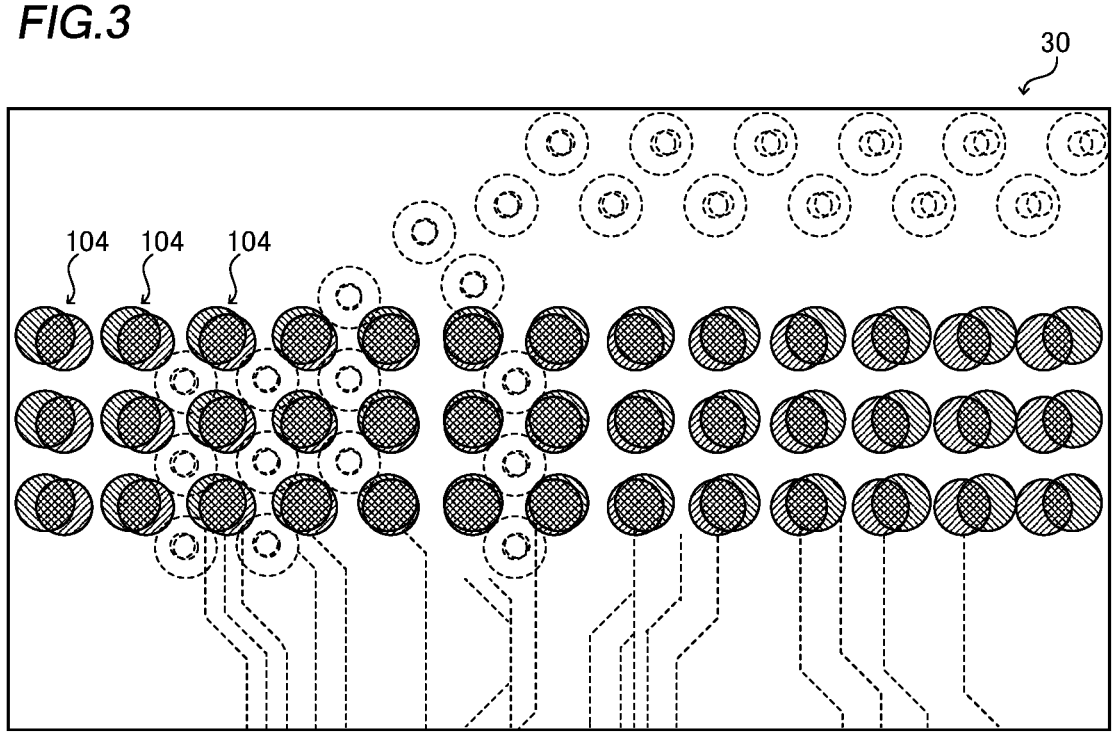
FIG. 3 is a diagram showing an exemplary X-ray image.

Embodiments embodying the present invention are hereinafter described on the basis of the drawings.

(Overall Configuration of X-Ray Imaging System)

An X-ray imaging system 100 according to one embodiment of the present invention is now described with reference to FIGS. 1 to 12.

As shown in FIG. 1, the X-ray imaging system 100 according to the embodiment can provide an internal image of a subject 101 by detecting X-rays that pass through the subject 101. For example, the X-ray imaging system 100 can be used for non-destructive inspection applications to provide an internal image of the subject 101 as an object.

As shown in FIG. 2, the subject 101 is an electronic device including a substrate 102. Electronic components 103 are mounted on both surfaces of the substrate 102. The electronic components 103 are electrically connected to the substrate 102 by a plurality of solder balls 104 (bumps). The plurality of solder balls 104 are arranged in a regular arrangement. Specifically, the plurality of solder balls 104 are regularly arranged in a grid arrangement on the substrate 102. In other words, the electronic components 103 are connected to the substrate 102 by using a BGA (Ball Grid Array). A plurality of solder balls 104 are arranged on each of front and back surfaces of the substrate 102. For example, in the subject 101, thirty nine solder balls 104 are arranged in a grip shape of three rows and thirteen columns on each of the front and back surfaces of the substrate 102. The solder balls 104 on the front surface of the substrate 102 and the solder balls 104 on the back surface overlap each other as viewed in a direction orthogonal to the front surface of the substrate 102. For example, the electronic components 103 include an electronic circuit, such as IC (integrated circuit). The X-ray imaging system 100 can perform non-destructive inspection for a defect such as a void (hole) in any of the solder balls 104, and solder bridging. Also, another electronic component 105, such as surface-mount type resistor or capacitor is mounted on the substrate 102 in addition to the electronic components 103. The plurality of solder balls 104 is an example of an "inspection target" or a "plurality of solder material pieces".

As shown in FIG. 1, the X-ray imaging system 100 includes a fluoroscopic device 10 and an analysis device 20. The fluoroscopic device 10 can generate an X-ray image 30 (see FIG. 3) by capturing an X-ray image of the subject 101. The analysis device 20 can apply analysis processing to the generated X-ray image 30. The analysis device 20 can apply analysis processing to the generated X-ray image 30.

The fluoroscopic device 10 includes an X-ray emitter 11, an X-ray detector 12 and an image generator 13. The X-ray emitter 11 is configured to emit X-rays to the subject 101 including the plurality of solder balls 104. The X-ray emitter 11 includes an X-ray tube configured to emit X-rays when electric power is supplied from a power supply (not shown). The X-ray detector 12 is configured to detect X-rays emitted from the X-ray emitter 11. The X-ray detector 12 is configured to provide electrical signals in accordance with the detected X-rays. The X-ray detector 12 includes a flat panel detector (FPD) as a detector for detecting X-rays, for example. The X-ray emitter 11 and the X-ray detector 12 are arranged in a housing (not shown) of the fluoroscopic device 10.

As shown in FIG. 3, the image generator 13 is configured to generate the X-ray image 30 based on X-rays detected by the X-ray detector 12. The image generator 13 is a computer including a processor such as CPU (Central Processing Unit) and a storage device for storing information. The image generator 13 is configured to control operations of parts of the fluoroscopic device 10. For example, the image generator 13 can control the power supply (not shown) whereby controlling emission of X-rays emitted by the X-ray emitter 11. Also, the image generator 13 can provide the generated X-ray image 30 to the analysis device 20.

The X-ray image 30 includes the plurality of solder balls 104, which are arranged having a regular arrangement, such as a grid arrangement. Because a plurality of solder balls 104 are arranged on each of the both surfaces of the substrate 102 in the subject 101, the X-ray image 30 includes overlap parts in which solder balls 104 overlap each other. Also, because the X-ray emitter 11 is a point source of light, the central and end parts of the X-ray image 30 have different overlapping degrees of solder balls 104 different from each other.

As shown in FIG. 1, the analysis device 20 includes a controller 21 and a storage 22. For example, the analysis device 20 is a personal computer that is connected to and can communicate with the fluoroscopic device 10. The controller 21 includes a CPU, a read only memory (ROM), a random access memory (RAM), etc. The controller 21 can include a processor such as a graphics processing unit (GPU) or a field-programmable gate array (FPGA) configured for image processing. The controller 21 is an example of a "model producer" in the claims.

The storage 22 is configured to store various programs to be executed by the controller 21, and parameters. The storage 22 includes an HDD (Hard Disk Drive) or a non-volatile memory such as SSD (Solid State Drive), for example.

A display 23 and an input device (user input acceptor) 24 are connected to the analysis device 20. The display 23 includes an LCD monitor, for example. The display 23 is configured to display images and text information based on the control by the controller 21. The input device 24 is configured to accept user inputs from users (user input instructions). The input device 24 includes a keyboard and a pointing device, such as a computer mouse, for example. The input device 24 can provide the user input signals in accordance with the accepted user inputs to the controller 21.

Figure 4:
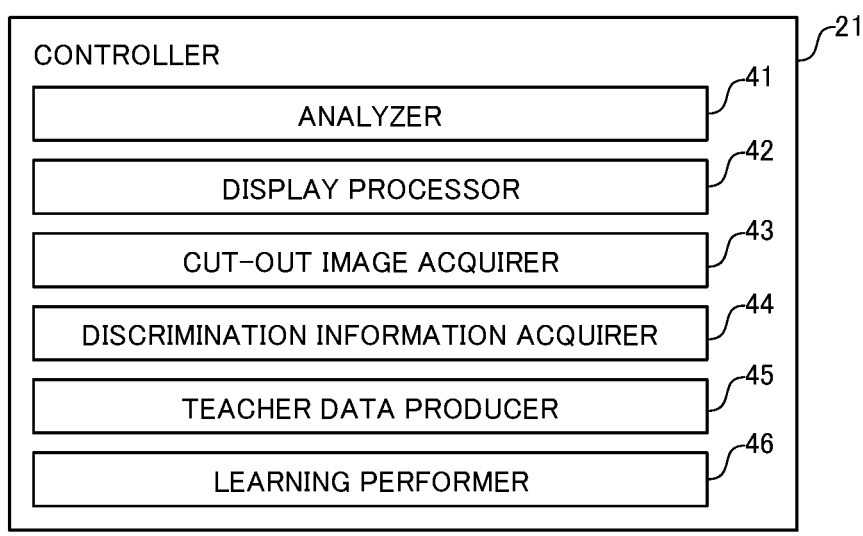
FIG. 4 is a block diagram illustrating the functional configuration of a controller.

Also, as shown in FIG. 4, the controller 21 includes an analyzer 41, a display processor 42, a cut-out image acquirer 43, a discrimination information acquirer 44, a teacher data producer 45 and a learning performer 46. The controller 21 can serve as the analyzer 41, the display processor 42, the cut-out image acquirer 43, the discrimination information acquirer 44, the teacher data producer 45 and the learning performer 46 by executing various programs (software) stored in the storage 22. In other words, the analyzer 41, the display processor 42, the cut-out image acquirer 43, the discrimination information acquirer 44, the teacher data producer 45 and the learning performer 46 in FIG. 4 are represented as functional software blocks. The present invention is not limited to this, but some of or all of the analyzer 41, the display processor 42, the cut-out image acquirer 43, the discrimination information acquirer 44, the teacher data producer 45 and the learning performer 46 can be constructed of a dedicated hardware circuit.

(Analysis of X-Ray Image by Analysis Device)

Figure 5:
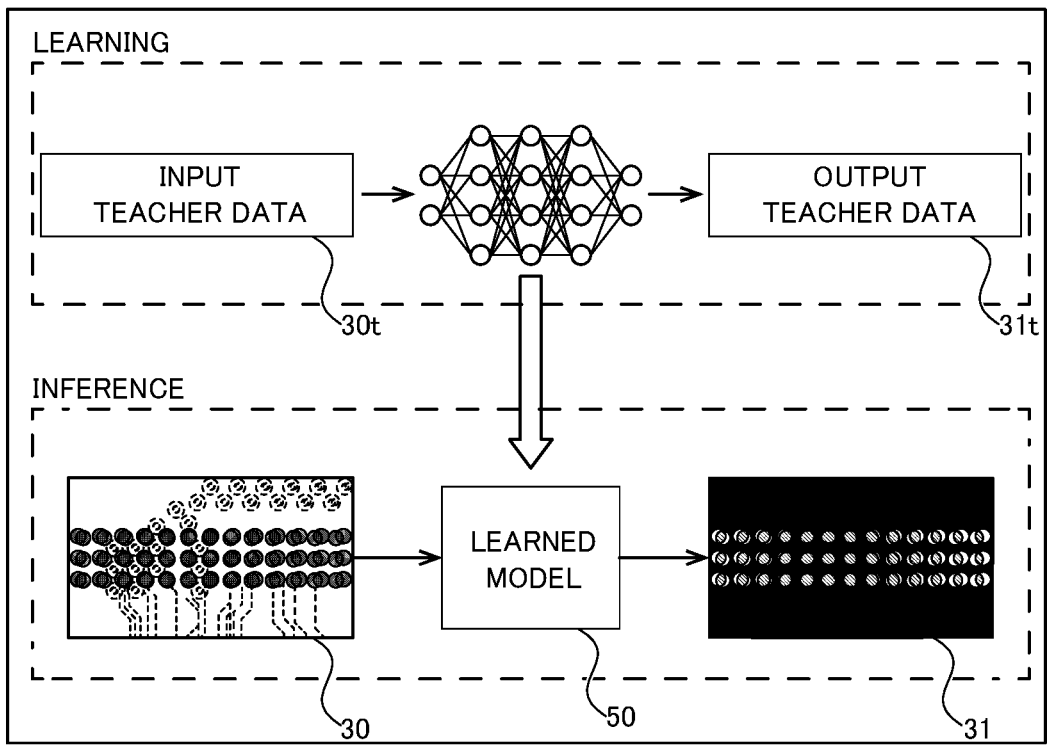
FIG. 5 is a diagram illustrating inference by using a learned model.

As shown in FIG. 5, the analyzer 41 is configured for analysis of the X-ray image 30 by using a learned model 50. Specifically, the analysis device 20 uses the learned model 50 to discriminate areas of the solder balls 104 whereby acquiring a discrimination result image 31 as a discrimination result (inference result) by the learned model 50 from the X-ray image 30. The learned model 50 can be produced by the controller 21 of the analysis device 20 and stored in the storage 22. The production of the learned model 50 will be discussed in detail later.

Figure 6:
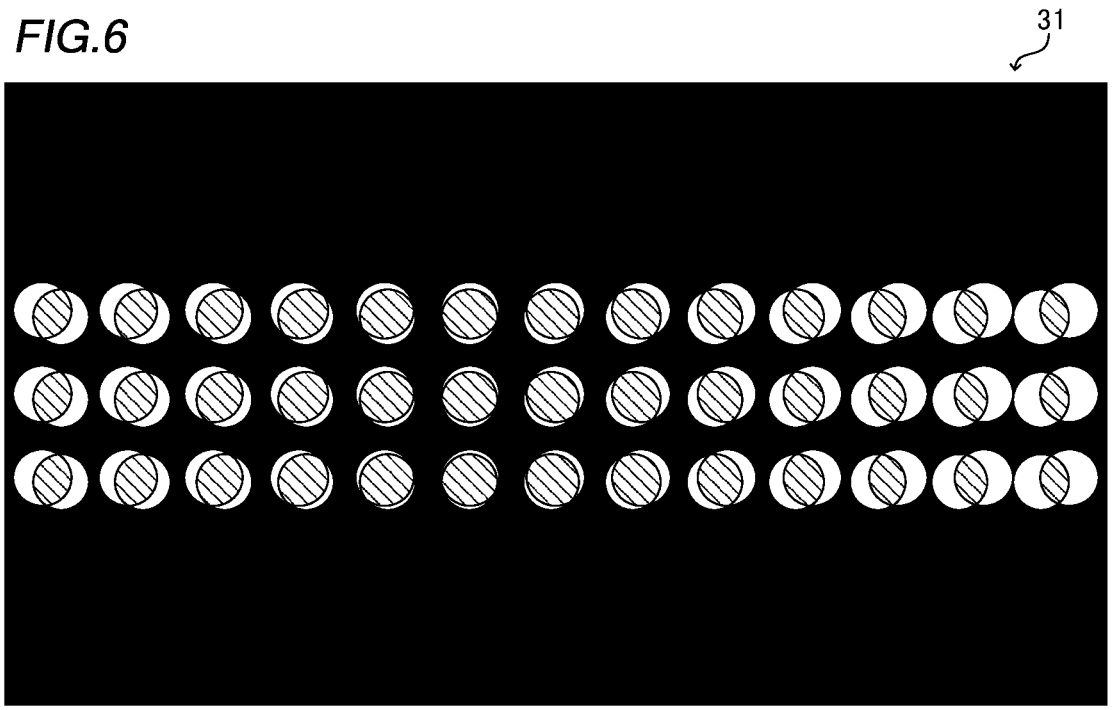
FIG. 6 is a diagram illustrating an exemplary discrimination result image provided by the inference using the learned model.

As shown in FIG. 6, the discrimination result image 31 is a label image including three types of discriminated areas of overlapping parts each of which is a part where the solder balls 104 on the both surfaces of the substrate 102 overlap each other, non-overlapping parts each of which is a part included only in only corresponding one of the solder balls 104 but excluded from the overlapping part (a part of one of the solder balls 104 that does not overlap another), and a background part where any of the solder balls 104 is not included. The overlapping parts where the solder balls 104 overlap each other, the non-overlapping parts, which are included in only their corresponding one of the solder balls 104 but excluded from the overlapping part, and the background part where no solder ball 104 exists are represented by solid gray, white, and black, respectively, in the discrimination result image 31. Note that the gray is represented by hatching in FIG. 6.

The analyzer 41 can determine based on the areas discriminated in the discrimination result image 31 whether any defect occurs in the solder balls 104 included in the X-ray image 30. The analyzer 41 detects the areas of the solder balls 104 in the X-ray image 30 based on the discrimination result image 31, and detects an area and a shape of each solder ball 104, for example. The analyzer 41 then determines based on the detected area and shape of each solder ball 104 whether any defect such as void (hole), poor wetting, solder bridging and spattering occurs in the solder ball 104.

The display processor 42 controls function of displaying images and text information on the display 23. For example, the X-ray image 30 and a teacher X-ray image 60 (see FIG. 7) described below can be displayed on the display 23 by the display processor 42. Also, the display processor 42 can discriminatively display a defect part that is determined in the X-ray image 30 as analysis result analyzed by the analyzer 41 on the display 23.

<Production of Learned Model>

As shown in FIG. 5, in this present embodiment, the controller 21 is configured to produce the learned model 50 for analysis of the X-ray image 30 generated by the image generator 13. The learned model 50 is produced by machine learning using data sets of input and output teacher data 30$t$ and 31$t$. The input teacher data sets 30$t$ are produced based on the teacher X-ray image 60 (see FIG. 7). The teacher X-ray image 60 is generated by the fluoroscopic device 10 similar to the X-ray image 30 to be analyzed.

For example, the X-ray imaging system 100 inspects a plurality of subjects 101 that have a common structure including the plurality of solder balls 104. To address this inspection, the X-ray imaging system 100 irradiates some of the subjects 101 of a plurality of subjects 101 with X-rays, and generates a plurality of X-ray images 30 whereby acquiring the X-ray images 30 as a plurality of teacher X-ray images 60. Subsequently, the learned model 50 is produced based on the acquired plurality of teacher X-ray images 60. To address this inspection, it is determined whether any defect occurs in the solder ball 104 based on X-ray images 30 of the other subjects 101 of the plurality of subjects 101 that are generated by irradiation of the other subjects 101 with X-rays. That is, the X-ray image 30 to be analyzed, and the teacher X-ray image 60 for producing the learned model 50 are images including subjects 101 (solder balls 104) having the same structure as each other.

Figure 7:
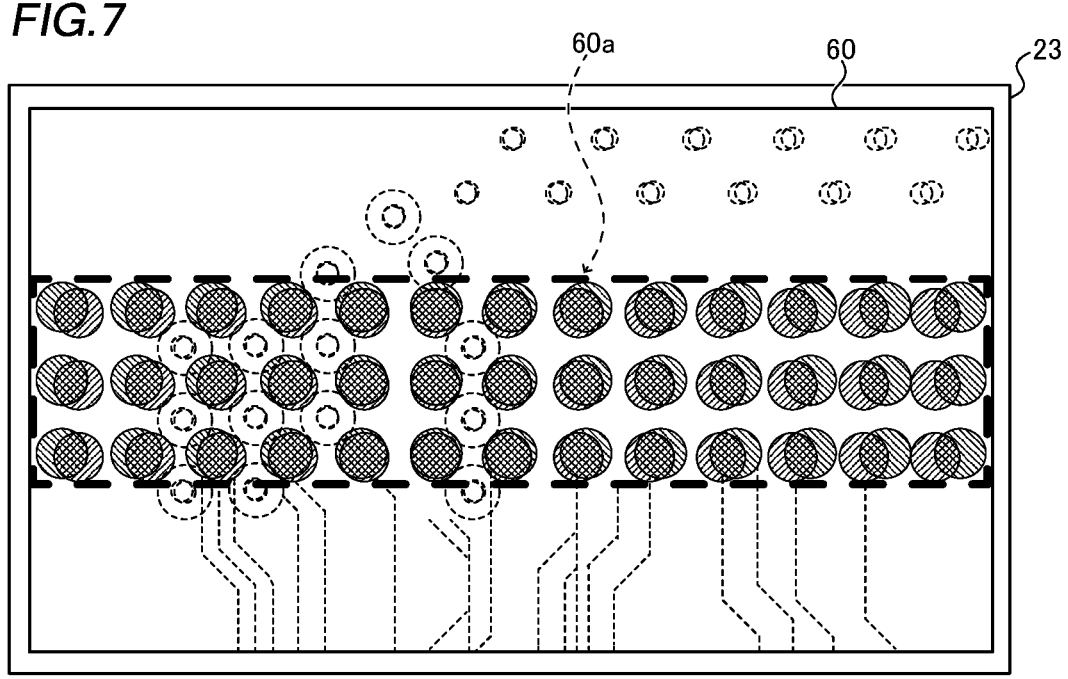
FIG. 7 is a diagram illustrating target area specification in a teacher X-ray image.

As shown in FIG. 7, the cut-out image acquirer 43 is configured to specifies a target area 60a including the plurality of solder balls 104 in the teacher X-ray image 60, which is acquired to produce the learned model 50. Specifically, the user input acceptor 24 accepts an area-specifying instruction that specifies the target area 60a in the teacher X-ray image 60. An operator (worker) will entirely see the teacher X-ray image 60 on display 23 displayed by the display processor 42, and provide the user input acceptor 24 with an area-specifying instruction that specifies the target area 60a. The cut-out image acquirer 43 acquires the target area 60a in the teacher X-ray image 60 specified by the area-specifying instruction provided by using the user input acceptor 24. At this time, the display 23 displays a dotted frame that indicates a range (boundary) of the target area 60a and is superimposed on the teacher X-ray image 60 as indication indicating the range of the specified target area 60a.

Figure 8:
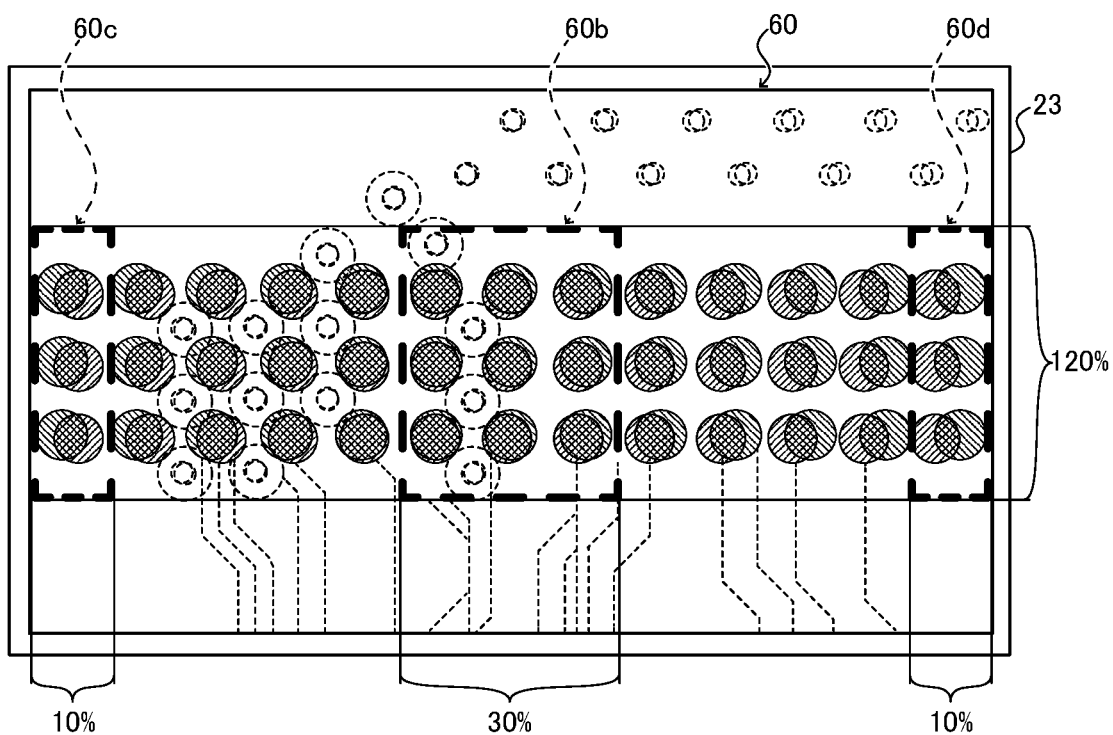
FIG. 8 is a diagram illustrating range specification used for acquisition of central and end images in the teacher X-ray image.

Subsequently, in response to the area-specifying instruction provided by using the user input acceptor 24, the cut-out image acquirer 43 acquires a central image 61b (see FIG. 10) that is cut out corresponding to a part 60b including a central part of the target area 60a, and two end images 61c and 61d (see FIG. 10) that are cut out corresponding to parts 60c and 60d including the end parts, which are different from the part 60b of the target area 60a, from the teacher X-ray image 60, which includes the plurality of solder balls 104 arranged having a regular arrangement, as shown in FIG. 8. The part 60b is an example of a "first part" in the claims. The parts 60c and 60d are an example of a "second part" in the claims. The central image 61b is an example of a "first image" in the claims. The end images 61c and 61d are an example of a "second image" in the claims.

Specifically, the cut-out image acquirer automatically specifies a range of the part 60b, which is a cut-out range of the central image 61b from the teacher X-ray image 60, and a range of the parts 60c and 60d, which are cut-out ranges of end images 61c and 61d from the teacher X-ray image 60, based on the target area 60a in the teacher X-ray image 60 specified by the area-specifying instruction accepted by the user input acceptor 24. For example, the cut-out image acquirer 43 specifies an area that expands from a center in the specified target area 60a in a vertical size 120% of the target area 60a and has a horizontal size 30% of the target area 60a as a range of the part 60b. Also, the cut-out image acquirer 43 specifies an area that expands from a left edge of the target area 60a in a horizontal size 10% of the target area 60a and has a vertical size 120% of the target area 60a as a range of the part 60c. Also, the cut-out image acquirer 43 specifies an area that expands from a right edge of the target area 60a in a horizontal size 10% of the target area 60a and has a vertical size 120% of the target area 60a as a range of the part 60d. The cut-out image acquirer 43 assigns a common size to the parts 60c and 60d. For example, sizes (ratios to the target area 60a) in the ranges of the parts 60b, 60c and 60d are previously specified.

In addition, the display 23 visually displays an indication indicating a range of the part 60b to be cut out from the teacher X-ray image 60 and indications indicating ranges of the parts 60c and 60d to be cut out from the teacher X-ray image. For example, the display 23 displays dotted frames that are superimposed on the teacher X-ray image 60 as indication indicating the ranges of the parts 60b, 60c and 60d similar to the target area 60a. Also, the cut-out image acquirer 43 specifies the ranges of the first and second parts 60b, 60c and 60d to be cut out from the teacher X-ray image 60 based on the user input instruction accepted that changes ranges of the parts 60b, 60c and 60d by the user input acceptor 24. In other words, the cut-out image acquirer 43 is configured to be able to change the previously specified ranges of the parts 60b, 60c and 60d. For example, the user input acceptor 24 accepts a range-specifying instruction that specifies (changes) ranges of the parts 60b, 60c and 60d when the indication indicating the ranges of the parts 60b, 60c and 60d is displayed together with the teacher X-ray image 60 on the display 23. When any of the ranges is changed, the display processor 42 will visually display the changed range on the display 23.

In this case, the cut-out image acquirer 43 specifies the ranges of the parts 60b, 60c and 60d which have a size not smaller than a predetermined threshold(s) based on the user input instruction (range-specifying instruction) that specifies (changes) ranges of the parts 60b, 60c and 60d accepted by the user input acceptor 24. The storage 22 previously stores the predetermined threshold. For example, the predetermined threshold is specified so as to prevent a horizontal size (length) of a range of the part 60b as the range of the central image 61b from becoming smaller than 20% of the target area 60a. Also, the predetermined threshold is specified so as to prevent a horizontal size (length) of a range of the part 60c or 60d as the range of the end image 61c or 61d from becoming smaller than 10% of the target area 60a. Also, the predetermined threshold is specified so as to prevent a vertical size (length) of a range of the part 60b, 60c or 60d from becoming smaller than 120% of the target area 60a. In other words, the cut-out image acquirer 43 is configured to prevent the central image 61b and the end images 61c and 61d to be cut out from becoming smaller than the predetermined size.

For example, the predetermined threshold for the horizontal size of each of the ranges of the parts 60b, 60c and 60d is greater than at least one solder ball 104 size in the parts 60b, 60c and 60d. In other words, the horizontal size of each of the ranges of the parts 60b, 60c and 60d can be specified greater than at least one cycle length in cycle lengths of the regular arrangement of the plurality of solder balls 104, which are regularly arranged.

Figure 9:
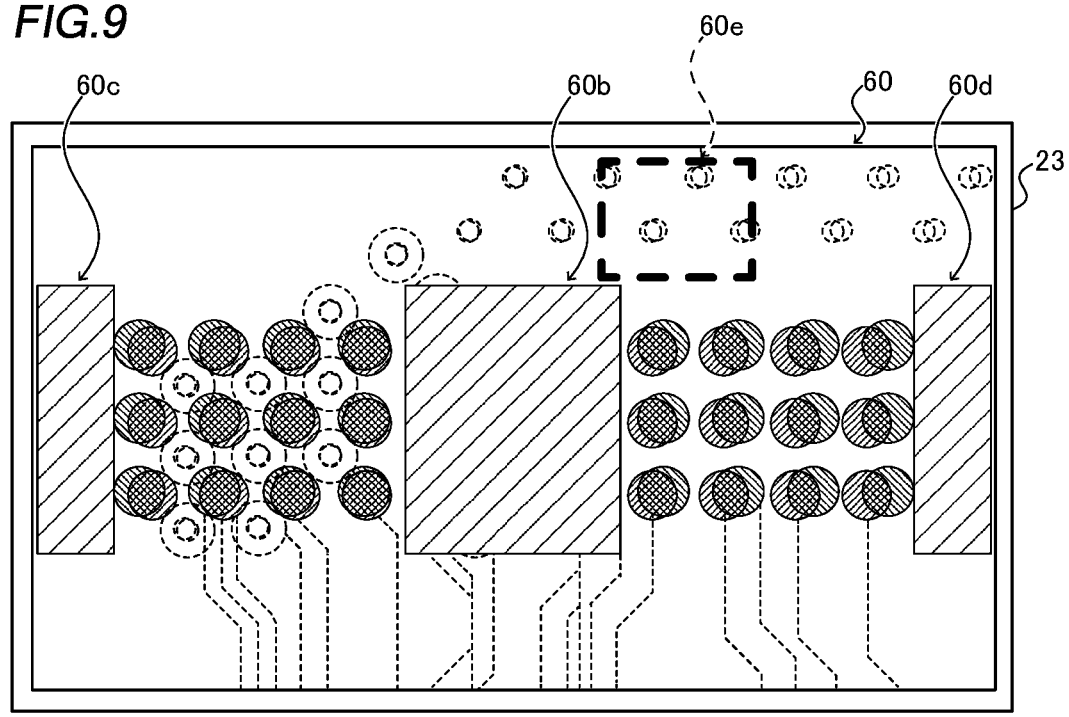
FIG. 9 is a diagram illustrating range specification about a background part in the teacher X-ray image.

Also, after the ranges of the part 60b, part 60c and part 60d are specified, the cut-out image acquirer 43 specifies a range of the background image 61e (see FIG. 10) corresponding to the background part 60e where no solder ball 104 exists to be cut out from the teacher X-ray image 60 based on the user input instruction accepted by the user input acceptor 24 as shown in FIG. 9. For example, the user input acceptor 24 accepts a range-specifying instruction that specifies the range of the background part 60e with the teacher X-ray image 60 being entirely displayed by the display processor 42. At this time, the ranges of the parts 60b, 60c and 60d, which have been specified, are discriminatively indicated on the displayed teacher X-ray image 60. For example, the ranges of the parts 60b, 60c and 60d are represented by solid gray. Also, the display 23 displays a dotted frame that indicates the range of the background part 60e and is superimposed on the teacher X-ray image 60 as indication indicating the range of the background part 60e. The background part 60e does not include any solder ball 104 but includes the substrate 102, the electronic component 105, etc., for example.

The cut-out image acquirer 43 acquires the central image 61b corresponding to the specified range of the part 60b, the end images 61c and 61d corresponding to the specified ranges of the parts 60c and 60d, and the background images 61e corresponding to the specified range of the background part 60e by cutting out them from the teacher X-ray image 60 in accordance with the range-specifying instructions.

In this embodiment, in a case in which the central image 61b, the end images 61c and 61d, and the background image 61e are acquired from a plurality of teacher X-ray images 60, the central image 61b, the end images 61c and 61d, and the background image 61e corresponding to common ranges in each teacher X-ray image 60 are acquired. Specifically, the user input acceptor 24 is configured to accept range-specifying instructions that specify the range of the part 60b, the ranges of the parts 60c and 60d, and the range of the background part 60e in one teacher X-ray image among the plurality of teacher X-ray images 60. The cut-out image acquirer 43 is configured to acquire a plurality of the central image 61b corresponding to a common range of the part 60b, which is specified in accordance with the range-specifying instruction in the one teacher X-ray image 60, cut out from the plurality of teacher X-ray images 60, a plurality of the end images 61c and 61d corresponding to a common ranges of the parts 60c and 60d, which is specified in accordance with the range-specifying instructions in the one teacher X-ray image 60, cut out from the plurality of teacher X-ray images 60, and a plurality of the background image 61e corresponding to a common range of the background part 60e, which is specified in accordance with the range-specifying instruction in the one teacher X-ray image 60, cut out from the plurality of teacher X-ray images 60.

Figure 10:
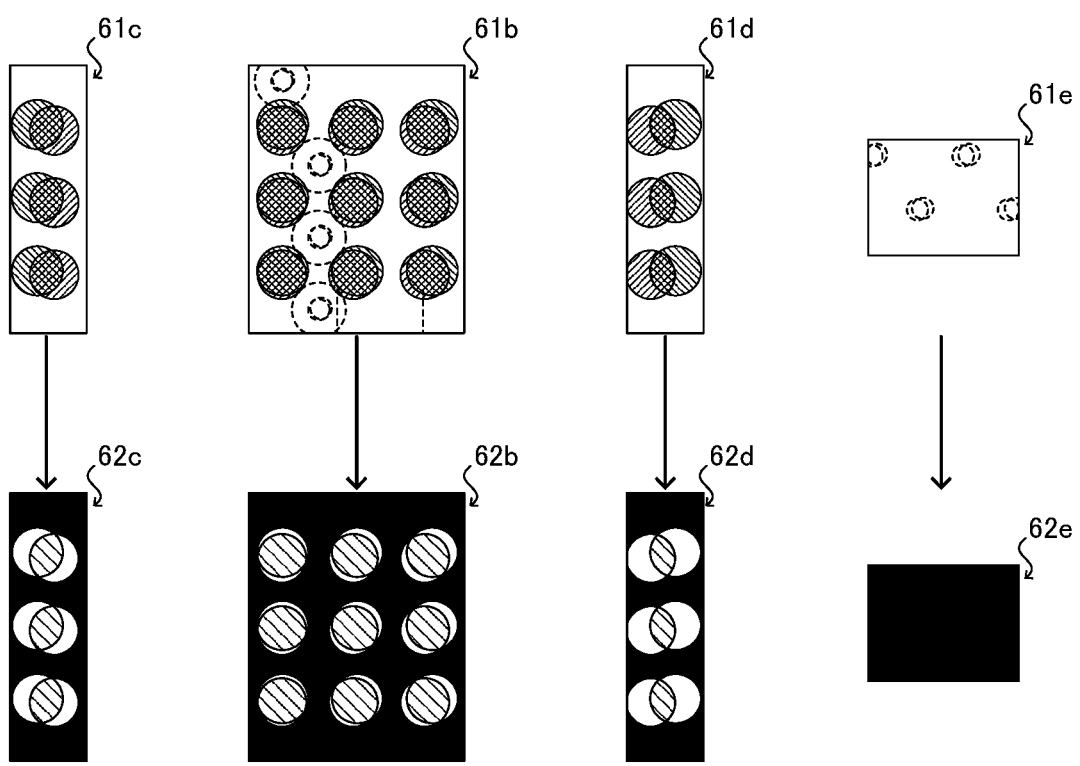
FIG. 10 is a diagram illustrating acquisition of discrimination images corresponding to the central, end and background images.

As shown in FIG. 10, the discrimination information acquirer 44 acquires discrimination information to discriminate areas of the solder balls 104 in the central image 61b, the end images 61c and 61d, and the background image 61e in response to an input instruction provided to the user input acceptor 24. Specifically, the discrimination information acquirer 44 acquires a discrimination image 62b, discrimination images 62c and 62d, and a discrimination image 62e which discriminate areas of the solder balls 104 in the central image 61b, the end images 61c and 61d, and the background image 61e, respectively, as the discrimination information in response to the input instruction provided to the user input acceptor 24.

Specifically, the display processor 42 displays the central image 61b, the end images 61c and 61d, and the background image 61e acquired by the cut-out image acquirer 43 on the display 23. Operators (workers) can see the central image 61b, the end images 61c and 61d, and the background image 61e displayed and classify (label) parts corresponding to the solder balls 104 included in the central image 61b, the end images 61c and 61d, and the background image 61e into their corresponding colors. For example, an operator classifies the overlapping parts where the solder balls 104 on the both surfaces of substrate 102 overlap each other, the non-overlapping parts, which are included in only their corresponding one of the solder balls 104 but excluded from the overlapping part, and the part where no solder ball 104 exists into solid gray, white, and black, respectively, in the central image 61b, the end images 61c and 61d, and the background image 61e, so that the discrimination information acquirer 44 can acquire the discrimination images 62b to 62e. Because the background image 61e will not include any solder ball 104, the black discrimination image 62e can be automatically entirely acquired.

Figure 11:
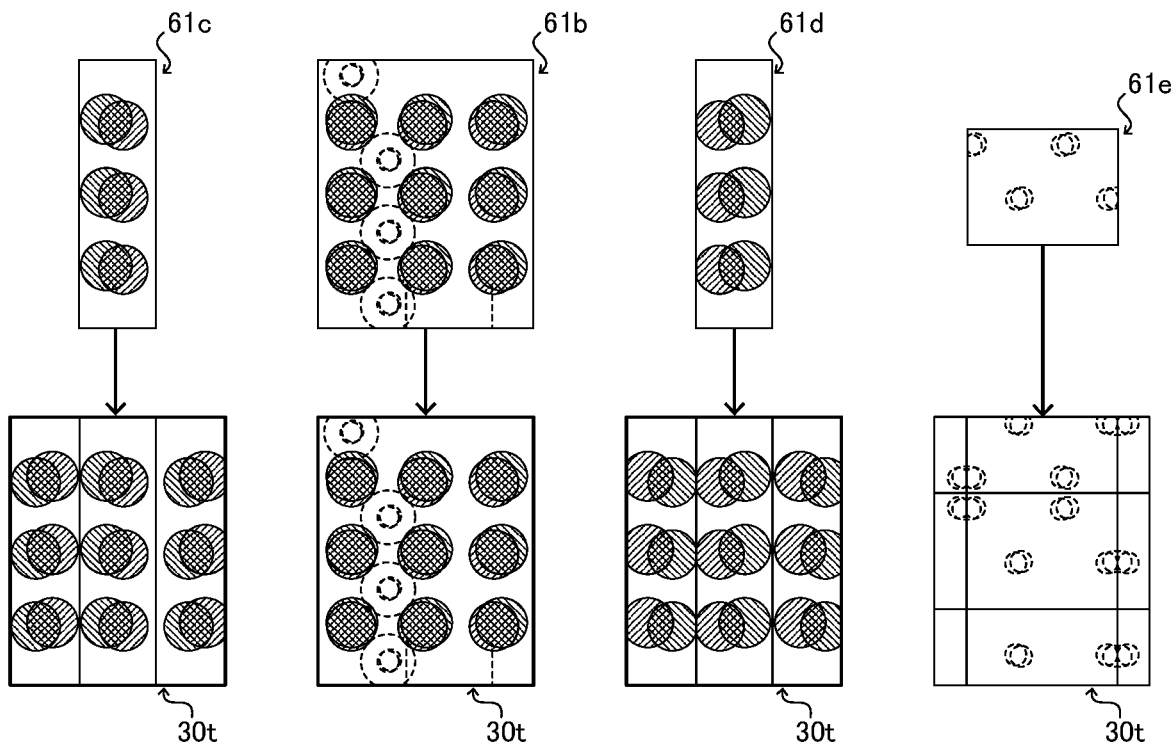
FIG. 11 is a diagram illustrating generation of input teacher data based on the central, end and background images.

As shown in FIG. 11, the teacher data producer 45 is configured to produce a plurality of input teacher data sets 30t based on the central image 61b, the end images 61c and 61d, and the background image 61e acquired by the cut-out image acquirer 43. Specifically, the teacher data producer 45 is configured to adjust the plurality of input teacher data sets 30t to a common size by using at least one of an inverse alignment in which a plurality of central images 61b, which are produced by reproducing the central image 61b, are inversely placed in alignment, and an inverse alignment in which a plurality of end images 61c and 61d, which are produced by reproducing the end images 61c and 61d, are inversely placed in alignment. Also, in a case in which input teacher data 30t is produced based on the background image 61e, the teacher data producer 45 also produces the input teacher data sets 30t having a common size by using an inverse alignment in which a plurality of background images 61e, which are produced by reproducing the background image 61e, are inversely placed in alignment.

For example, the teacher data producer 45 acquires as a vertical size of the input teacher data sets 30t a vertical size of the image that has the largest vertical size from the central image 61b, the end images 61c and 61d, and the background image 61e acquired by the cut-out image acquirer 43. Also, the teacher data producer 45 acquires as a horizontal size of the input teacher data sets 30t a horizontal size of the image that has the largest horizontal size from the central image 61b, the end images 61c and 61d, and the background image 61e acquired by the cut-out image acquirer 43.

Subsequently, the teacher data producer 45 reproduces the central image 61b, the end images 61c and 61d, and the background image 61e that have the same vertical and horizontal sizes as the acquired input teacher data sets 30t, and inversely places the reproduced images in alignment (inverse alignment). In an example of FIG. 11, among the central image 61b, the end images 61c and 61d, and the background image 61e, the central image 61b has the largest vertical and horizontal lengths. As a result, the size of the input teacher data sets 30t agrees with the size of central image 61b. The teacher data producer 45 adjusts sizes of the end images 61c and 61d, and the background image 61e to a common size with (same size as) the central image 61b. In this adjustment, when horizontal lengths of sizes of the end images 61c and 61d, and the background image 61e are increased, the teacher data producer 45 places adjacent to the end images 61c and 61d, and the background image 61e on the right and left sides the end images 61c and 61d, and the background image 61e that are produced by reproducing them and horizontally inverted. For example, if a horizontal size difference between the common horizontal length and the horizontal length of the end image or the background image is not an integral multiple of the horizontal length of the end image or the background image, images that are not a fully-reproduced image are placed adjacent to the end image or the background image on the right and left sides. Also, if a plurality of reproduced images are arranged adjacent to each other, the reproduced images adjacent to each other are inversely placed relative to each other. In other words, the end image 61c or 61d, or the background image 61e that is not inverted and the end image 61c or 61d, or the background image 61e that is inverted are alternately arranged. Also, if a vertical length of an image increased, the teacher data producer 45 can reproduce the image, and can similarly place reproduced images, which are reproduced from the image, in the alternate arrangement in which non-inverted and inverted reproduced images are alternately arranged.

Figure 12:
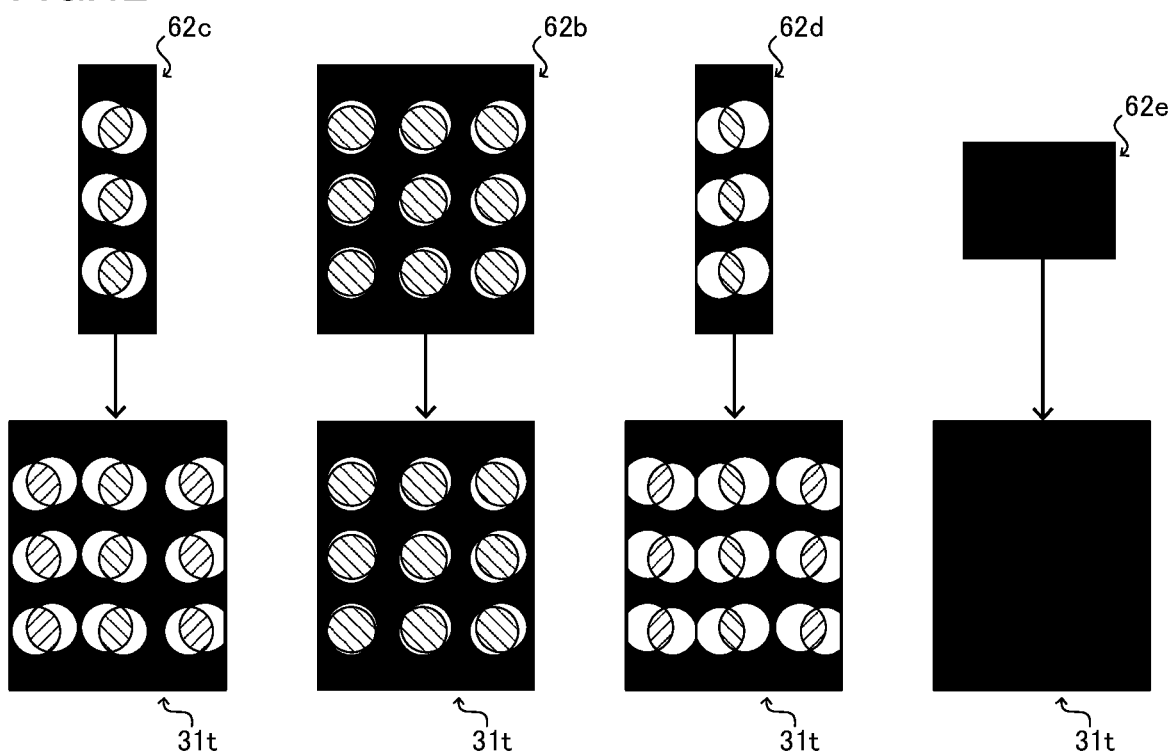
FIG. 12 is a diagram illustrating generation of output teacher data based on the discrimination images.

As shown in FIG. 12, the teacher data producer 45 is configured to produce a plurality of output teacher data sets 31t based on the discrimination images 62b, 62c, 62d and 62e. The teacher data producer 45 applies processing similar to the acquisition of the input teacher data sets 30t to the discrimination images 62b to 62e. In other words, similar to the central image 61b, the end images 61c and 61d, and the background image 61e corresponding to the discrimination image 62b to 62e, the teacher data producer 45 produces the output teacher data sets 31t having a common size by using an inverse alignment in which a plurality of the discrimination images 62b to 62e, which are produced by reproducing them, are inversely placed in alignment. Because the discrimination image 62e corresponding to the background image 61e is an image that is entirely represented by solid black, the output teacher data sets 31t that is entirely represented by solid black can be acquired in accordance with a size of the output teacher data sets 31t that is acquired without the aforementioned inverse alignment processing. As a result, the teacher data producer 45 can produce a plurality of input teacher data sets 30t and a plurality of output teacher data sets 31t which are images having the common size.

As shown in FIG. 5, the learning performer 46 is configured to perform machine learning for producing the learned model 50 by using the input teacher data sets 30t based on the central image 61b, the end images 61c and 61d, and the background image 61e, and the output teacher data sets 31t based on the discrimination images 62b, 62c, 62d and 62e corresponding to the central image 61b, the end images 61c and 61d, and the background image 61e. In other words, the learning performer 46 uses a plurality of input teacher data sets 30t and a plurality of output teacher data sets 31t produced by the teacher data producer 45 as data sets to perform machine learning for producing the learned model 50. The learned model 50 is produced by machine learning using deep learning. For example, the learning performer 46 generates the learned model 50 by using machine learning based on U-Net, which is one type of Fully Convolutional Network (FCN). The learned model 50 is produced by leaning to apply image conversion (image reconstruction) to pixels in the central image 61b, the end images 61c and 61d, and the background image 61e, which are inputs, so as to classify the overlapping parts where the solder balls 104 on the both surfaces overlap each other, the non-overlapping parts, which are included in only their corresponding one of the solder balls 104 but excluded from the overlapping part, and the part where no solder ball 104 exists into solid gray, white, and black, respectively.

(X-Ray Image Analysis Method of the Embodiment)

Figure 13:
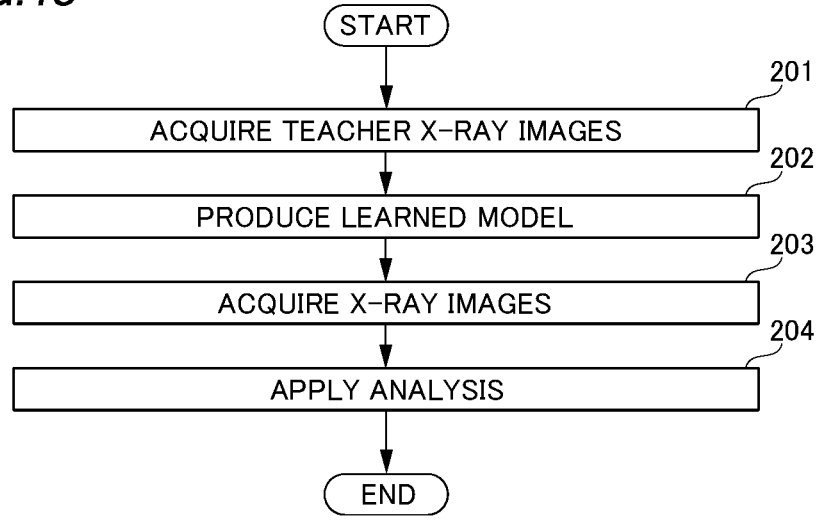
FIG. 13 is a diagram (flowchart) illustrating an X-ray image analysis method using a learned model.

An X-ray image analysis method according to this embodiment is now described with reference to FIG. 13. Control processing in steps 201 to 204 is performed by executing a program by means of the controller 21.

A plurality of teacher X-ray images 60 for producing the learned model 50 is first acquired in step 201. Subsequently, the learned model 50 is produced based on the plurality of teacher X-ray images 60 in step 202. The produced learned model 50 is stored into the storage 22. Subsequently, a plurality of X-ray images 30 as analysis targets are acquired in step 203. The plurality of X-ray images 30 as analysis targets are generated based on X-ray imaging in which X-ray images of a plurality of subjects 101 as inspection targets are captured. Subsequently, analysis using the produced learned model 50 in step 202 is applied to the acquired plurality of X-ray images 30 in step 204. In the analysis using the learned model 50, a plurality of discrimination result images 31 are acquired from a plurality of X-ray images 30 as analysis targets. Subsequently, it is determined based on the acquired plurality of discrimination result images 31 whether any defect occurs in a plurality of solder balls 104 included in the subject 101. Any one of the acquisition of the plurality of teacher X-ray images 60 in step 201, and the acquisition of the plurality of X-ray images 30 in step 203 can be executed prior to another. Also, a plurality of teacher X-ray images 60 can be acquired from a plurality of X-ray images 30 acquired.

(Learned Model Production Method)

Figure 14:
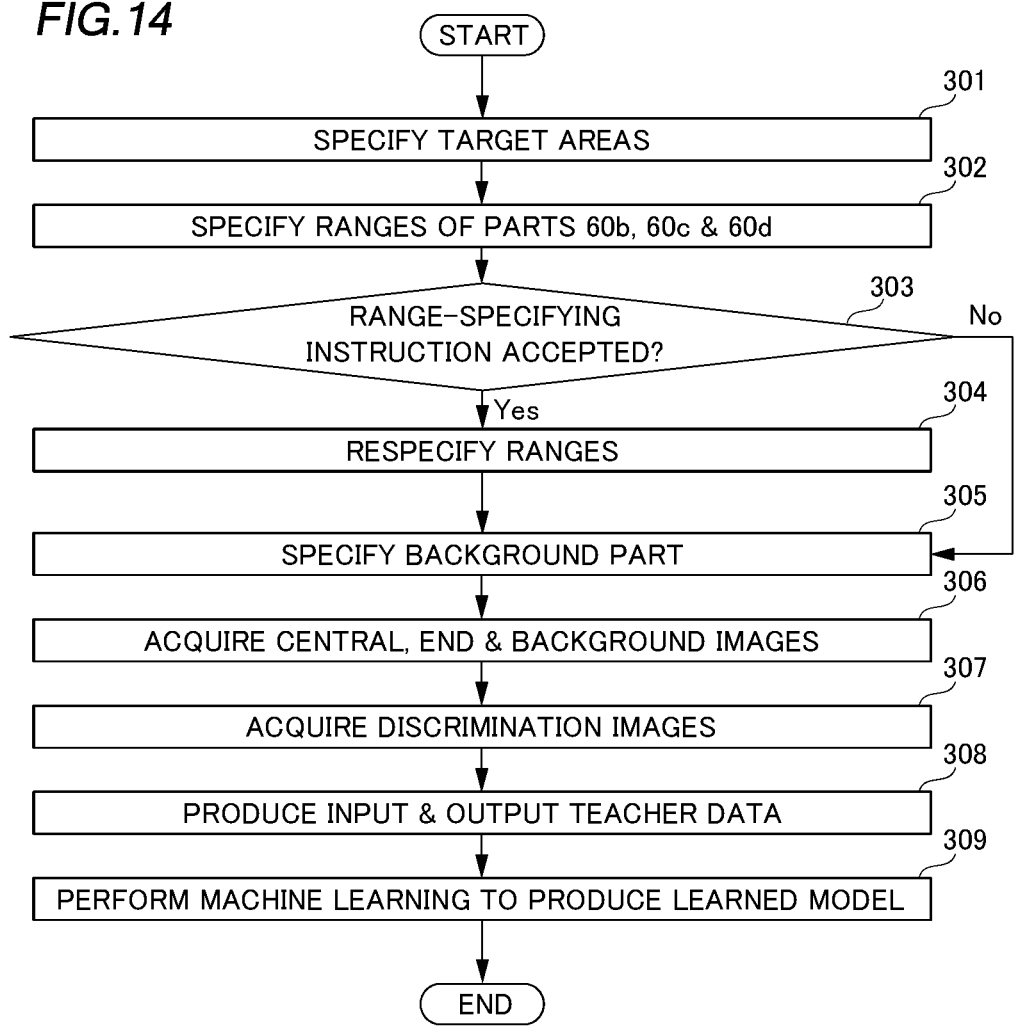
FIG. 14 is a diagram (flowchart) illustrating a learned model production method.

A learned model production method according to this embodiment is now described with reference to FIG. 14. Control processing in steps 301 to 309 represents the control processing of production of the learned model 50 in step 202 of FIG. 13. Control processing in steps 301 to 309 is performed by executing the program by means of the controller 21.

A target area 60a is first specified in one teacher X-ray image 60 among the acquired plurality of teacher X-ray images 60 in step 301. The target area 60a is specified in accordance with an area-specifying instruction as an input instruction through the user input acceptor 24.

Subsequently, ranges of the parts 60b, 60c and 60d to be cut out from the one teacher X-ray image 60 are automatically specified based on the specified target area 60a in step 302.

Subsequently, it is determined whether a range-specifying instruction as an input instruction that changes (specifies) a range of any of the parts 60b, 60c and 60d is accepted in step 303. If it is determined that the range-specifying instruction is accepted, the procedure goes to step 304. If it is determined that no range-specifying instruction is accepted, the procedure goes to step 305.

Subsequently, ranges of the parts 60b, 60c and 60d are newly specified in accordance with the range-specifying instruction in step 304. In this range specification, the ranges of the parts 60b, 60c and 60d are specified so as to have a size not smaller than a predetermined threshold. In other words, any instruction that specifies a range smaller than the predetermined threshold is not accepted. Subsequently, the procedure goes to step 305.

A background part 60e is specified in accordance with an input instruction through the user input acceptor 24 in step 305. The step 305 for specifying the background part 60e can be omitted.

Subsequently, the central image 61b, the end images 61c and 61d, and the background image 61e are acquired in step 306. Specifically, the central image 61b obtained by cutting out the part 60b from the teacher X-ray image 60, which corresponds to the X-ray image 30 generated by irradiating the plurality of solder balls 104 having a regular arrangement with X-rays, the end images 61c and 61d that are obtained by cutting out the part 60c and 60d different from the part 60b from the teacher X-ray image, and the background image 61e that is obtained by cutting out the background part 60e from the teacher X-ray image are acquired. Also, in accordance with the ranges of the parts 60b, 60c and 60d specified in step 302 or 304, and the background part 60e specified in step 305, common ranges of the central images 61b, common ranges of the end images 61c and 61d, and common ranges of the background images 61e are collectively acquired from the plurality of teacher X-ray images 60.

Subsequently, discrimination information to discriminate areas of the solder balls 104 in the central image 61b, the end images 61c and 61d, and the background image 61e are acquired in response to an input instruction provided to the user input acceptor 24 in step 307. Specifically, the discrimination image 62b, the discrimination images 62c and 62d, and the discrimination image 62e, which correspond to the central image 61b, the end images 61c and 61d, and the background image 61e, respectively, are acquired in response to the input instruction provided to the user input acceptor 24.

Subsequently, the input teacher data sets 30t and the output teacher data sets 31t are produced in step 308. Specifically, based on the central image 61b and the end images 61c and 61d, and the background image 61e that are acquired in step 306, the central image 61b and the end images 61c and 61d, and the background image 61e are reproduced and the reproduced images adjacent to each other are inversely placed relative to each other so that the plurality of input teacher data sets 30t as images having a common size are produced. Also, based on discrimination images 62b, 62c, 62d and 62e acquired in step 307, the discrimination images 62b to 62e are reproduced and the reproduced images adjacent to each other are inversely placed relative to each other so that the plurality of output teacher data sets 31t as images having a common size are produced.

Subsequently, machine learning for producing the learned model 50 is performed in step 309. Specifically, machine learning using deep learning for producing the learned model 50 for analyzing the X-ray images 30 is performed by using the plurality of input teacher data sets 30t produced based on the central image 61b and the end images 61c and 61d, and the background image 61e in step 308, and the plurality of output teacher data sets 31t produced based on the discrimination images 62b to 62e in step 308.

Advantages of the Embodiment

In this embodiment, the following advantages are obtained.

In this embodiment, as discussed above, the X-ray imaging system 100 can acquire a central image 61b (first image) that is cut out corresponding to a part 60b (first part) from a teacher X-ray image 60 including solder balls 104 (inspection targets) having a regular arrangement, and end images 61c and 61d (second images) that are cut out corresponding to parts 60c and 60d (second parts) different from the part 60b from the teacher X-ray image. Discrimination images 62b to 62d (discrimination information) to discriminate areas of the solder balls 104 in the central image 61b, the end images 61c and 61d are acquired. Accordingly, the acquired discrimination images 62b to 62d to discriminate the central image 61b of the teacher X-ray image 60 with the part 60b being cut out from the teacher X-ray image, and the end images 61c and 61d of the teacher X-ray image with the parts 60c and 60d being cut out from the teacher X-ray image can reduce a burden on operators of acquiring the discrimination images 62b to 62d as compared with a case in which operators acquire the discrimination images 62b to 62d corresponding to the entire teacher X-ray image 60. As a result, because a burden on operators of acquiring output teacher data 31t to perform machine learning can be reduced, when a learned model 50 to detect areas of the solder balls 104 is produced, it is possible to reduce such a burden on operators in teacher data production. Also, in a case in which X-rays are emitted by a point source of light in X-ray imaging, in a generated X-ray image 30, a central image in an emission center of X-rays and peripheral images in peripheral parts away from the emission center are images corresponding to different incident angle directions of X-rays different from each other. To address this, in this embodiment, the central image 61b, which is cut out corresponding to the part 60b from the teacher X-ray image 60 including the solder balls 104 having a regular arrangement, and the end images 61c and 61d, which are cut out corresponding to the parts 60c and 60d different from the part 60b from the teacher X-ray image, are acquired. Because the solder balls 104 in the teacher X-ray image 60 are arranged in a regular arrangement, images of the solder balls 104 in the central image 61b and the end images 61c and 61d can be projection images corresponding to a structure having a common arrangement relation. Accordingly, the part 60b, and the parts 60c and 60d including images corresponding to different angle directions of X-rays incident on a structure having a common arrangement relation can be cut out from the teacher X-ray image 60 by acquiring the central image 61b and the end images 61c and 61d. For this reason, even in a case in which not the entire teacher X-ray image 60 but images that are cut out corresponding to parts of the teacher X-ray image are used, teacher data can be acquired to properly represent the entire projection image of the teacher X-ray image 60, and as a result it is possible to prevent accuracy reduction of discrimination result by the learned model 50 generated by machine learning. Therefore, a burden on operators in teacher data production for producing a learned model 50 can be reduced by using the central image 61b and the end images 61c and 61d cut out from the teacher X-ray image 60 while accuracy reduction of discrimination result is prevented.

In addition, additional advantages can be obtained by the aforementioned embodiment added with configurations discussed below.

That is, in this embodiment, as discussed above, the cut-out image acquirer 43 (controller 21) is configured to acquire a central image 61b (first image) that is cut out corresponding to a part 60b (first part) including a central part of the target area 60a where solder balls 104 (inspection target) are arranged from a teacher X-ray image 60, and end images 61c and 61d (second images) that are cut out corresponding to parts 60c and 60d (second parts) each of which includes its corresponding end part of the target area 60a from the teacher X-ray image. Here, when solder balls 104 are non-destructively inspected by X-ray imaging, X-rays are typically emitted to a center position of an area where the solder balls 104 are arranged as an emission center. In such inspection, a difference between images of the central part and the end parts of a target area 60a will be large. To address this, in this embodiment, a central image 61b that is cut out corresponding to a part 60b including a central part of the target area 60a from a teacher X-ray image 60, and end images 61c and 61d that are cut out corresponding to parts 60c and 60d each of which includes its corresponding end part of the target area 60a from the teacher X-ray image are acquired. Accordingly, a projected image of the solder balls 104 near the emission center of X-rays can be acquired by acquiring the central image 61b, while projected X-ray images of the solder balls 104 at the most inclined emission direction in the teacher X-ray image 60 can be acquired by acquiring the end images 61c and 61d. For this reason, teacher data that more properly represents the entire projection image of the teacher X-ray image 60 can be acquired by using the central image 61b, and the end images 61c and 61d. As a result, it is possible to prevent accuracy reduction of discrimination result by the learned model 50 generated by machine learning.

In this embodiment, as discussed above, the X-ray emitter 11 is configured to emit X-rays to a plurality of solder balls 104 (solder material piece, inspection target) arranged in a grid arrangement as the regular arrangement; and the discrimination information acquirer 44 (controller 21) is configured to acquire discrimination images 62b to 62d which discriminate areas of the solder balls 104 in the central image 61b (first image) and the end images 61c and 61d (second images) as discrimination information. According to this configuration, in a case in which a learned model 50 is produced by using machine learning to analyze solder balls 104 arranged in a grid arrangement as the regular arrangement on a substrate 102, a burden on operators in the teacher data production for producing the learned model 50 can be reduced.

In this embodiment, as discussed above, a user input acceptor 24 configured to accept an user input instruction is provided; the user input acceptor 24 accepts an area-specifying instruction that specifies the target area 60a including the solder balls 104 (inspection target) in the teacher X-ray image 60; and the cut-out image acquirer 43 (controller 21) is configured to automatically specify a range of the part 60b (first part) and ranges of the parts 60c and 60d (second parts) from the teacher X-ray image 60 based on the target area 60a in the teacher X-ray image 60 specified by the area-specifying instruction accepted by the user input acceptor 24. According to this configuration, in accordance with the area-specifying instruction that specifies a target area 60a so as to include the solder ball 104 arranged in a regular arrangement in teacher X-ray image 60, a range of the part 60b and ranges of the parts 60c and 60d can be automatically specified so as to properly represent the regular arrangement of the solder balls 104 in the teacher data. For this reason, a burden of specifying a range of the part 60b and ranges of the parts 60c and 60d in consideration of such a regular arrangement of solder balls 104 can be reduced. Therefore, a burden on operators in teacher data production for producing a learned model 50 can be reduced.

In this embodiment, as discussed above, an X-ray imaging system 100 includes a display 23 configured to display the teacher X-ray image 60, and a user input acceptor 24 configured to accept an user input instruction, wherein the display 23 visually displays an indication indicating a range of the part 60s (first part) to be cut out from the teacher X-ray image 60, and indications indicating ranges of the parts 60c and 60d (second parts) to be cut out from the teacher X-ray image; and the cut-out image acquirer 43 (controller 21) specifies the ranges of the parts 60b, 60c and 60d to be cut out from the teacher X-ray image 60 based on the user input instruction accepted by the user input acceptor 24. According to this configuration, operators (workers) can specify a range of the part 60b, and ranges of the parts 60c and 60d while visually seeing an indication indicating a range of the part 60b, and indications indicating ranges of the parts 60c and 60d indicated on the display 23. For this reason, operators can see the display 23 and easily specify a range of the part 60b and ranges of the parts 60c and 60d in consideration of a regular arrangement of solder balls 104 (inspection targets). As a result, because teacher data can be acquired based on the central image 61b and the end images 61c and 61d, which are cut out corresponding to suitable parts from the teacher X-ray image 60 in accordance with the regular arrangement of the solder ball 104, it is possible to more strongly prevent accuracy reduction of discrimination result by the learned model 50 generated by machine learning also in a case in which the teacher data based on the images that are cut out corresponding to parts of the teacher X-ray image is used.

In this embodiment, as discussed above, the cut-out image acquirer 43 (controller 21) is configured to specify the ranges of the parts 60b, 60c and 60d (first and second parts) which have a size not smaller than a predetermined threshold based on the user input instruction accepted by the user input acceptor 24. According to this configuration, it is possible to prevent the cut-out ranges of the parts 60b, 60c and 60d from becoming too small. As a result, when machine learning is performed by using teacher data acquired based on the central image 61b and the end images 61c and 61d, it is possible to prevent accuracy reduction of discrimination result by the generated learned model 50. As a result, in a case in which the ranges of the parts 60b, 60c and 60d are specified in accordance with an input instruction, it is possible to effectively prevent accuracy reduction of discrimination result by the learned model 50 generated by machine learning.

In this embodiment, as discussed above, the controller 21 (model producer) further includes a teacher data producer 45 configured to generate the input teacher data sets 30t based on the central image 61b (first image) and the end images 61c and 61d (second images) acquired by the cut-out image acquirer 43; and the teacher data producer 45 is configured to adjust the input teacher data sets 30t to a common size by using at least one of an alignment in which a plurality of central images 61b, which are produced by reproducing the central image, are placed in alignment, and an alignment in which a plurality of end images 61c and 61d, which are produced by reproducing the end images, are placed in alignment. According to this configuration, in a case in which the input teacher data sets 30t are produced based on the central image 61b and the end images 61c and 61d, which are cut out corresponding to different parts, the input teacher data sets 30t can be adjusted to a common size, and as a result, it is possible to prevent accuracy reduction of discrimination result by the generated learned model 50.

In this embodiment, as discussed above, the teacher data producer 45 (controller 21) is configured to adjust the input teacher data sets 30t to a common size by using at least one of an inverse alignment in which the central images 61b (first images) are inversely placed in alignment and an inverse alignment in which the end images 61c and 61d (second images) are inversely placed in alignment. According to this configuration, in a case in which at least one of the central images 61b and the end images 61c or 61d are inversely placed in alignment, smooth boundaries can be obtained between the images placed in alignment by using at least one of an inverse alignment in which the central images 61b are inversely placed in alignment and an inverse alignment in which the end images 61c and 61d are inversely placed in alignment. Accordingly, because sharpness reduction of the images that are placed in alignment can be prevented, it is possible to more strongly prevent accuracy reduction of discrimination result by the generated learned model 50 when input teacher data sets 30t are adjusted to a common size.

In this embodiment, as discussed above, the cut-out image acquirer 43 (controller 21) is configured to acquire a background image 61e corresponding to a background part 60e cut out from the teacher X-ray image 60 so as to exclude the solder balls 104 (inspection targets); and the learning performer 46 (controller 21) is configured to perform machine learning for producing a learned model 50 by using the input teacher data sets 30t based on the central image 61b (first image) and the end images 61c and 61d (second images), and the background image 61e. According to this configuration, machine learning can be performed by using the background image 61e corresponding to a cut-out background part 60e in addition to the parts 60b, part 60c and 60d of the target area 60a including solder balls 104. As a result, as compared with a case in which machine learning is performed by using teacher data acquired based on the central image 61b and the end images 61c and 61d, accuracy reduction of discrimination result by the generated learned model 50 can be improved by machine learning using the background image 61e.

In this embodiment, as discussed above, a user input acceptor 24 configured to accept an user input instruction is provided; the user input acceptor 24 can accept a range-specifying instruction specifying ranges of the parts 60b, 60c and 60d (first and second parts) in one teacher X-ray image 60 among a plurality of the teacher X-ray images 60; and the cut-out image acquirer 43 (controller 21) is configured to acquire a plurality of central images 61b (first images) corresponding to the common range of the part 60b, which is specified in accordance with the range-specifying instruction specified in the one teacher X-ray image 60, cut out from the plurality of teacher X-ray images 60, and a plurality of end images 61c and 61d (second images) corresponding to the common range of the parts 60c and 60d (second parts), which are specified in accordance with the range-specifying instruction specified in the one teacher X-ray image 60, cut out from the plurality of teacher X-ray images. According to this configuration, because the common range of the part 60b, and the common range of the parts 60c and 60d can be cut out from a plurality of teacher X-ray images 60, a plurality of central images 61b, and a plurality of end images 61c and a plurality of end images 61d can be collectively cut out when machine learning is performed by using the plurality of teacher X-ray images 60 including solder balls 104 (inspection targets) having a common arrangement. Therefore, a burden on operators in teacher data production of teacher data can be reduced in a case in which the teacher data is produced by using a plurality of teacher X-ray images 60.

Advantages of Learned Model Production Method of the Embodiment

In the learned model production method according to this embodiment, the following advantages are obtained.

In the learned model production method according to this embodiment, as discussed above, a central image 61b (first image) that is cut out corresponding to a part 60b (first part) from a teacher X-ray image 60 including solder balls 104 (inspection targets) having a regular arrangement, and end images 61c and 61d (second images) that are cut out corresponding to parts 60c and 60d (second parts) different from the part 60b from the teacher X-ray image can be acquired. Discrimination images 62b to 62d (discrimination information) to discriminate areas of the solder balls 104 in the central image 61b, the end images 61c and 61d are acquired. Accordingly, the acquired discrimination images 62b to 62d to discriminate the central image 61b of the teacher X-ray image 60 with the part 60b being cut out from the teacher X-ray image, and the end images 61c and 61d of the teacher X-ray image with the parts 60c and 60d being cut out from the teacher X-ray image can reduce a burden on operators of acquiring the discrimination images 62b to 62d as compared with a case in which operators acquire the discrimination images 62b to 62d corresponding to the entire teacher X-ray image 60. As a result, because a burden on operators of acquiring output teacher data 31t to perform machine learning can be reduced, it is possible to provide a learned model production method capable of reducing such a burden on operators in teacher data production for producing a learned model 50 to detect areas of the solder balls 104. Also, in a case in which X-rays are emitted by a point source of light in X-ray imaging, in a generated X-ray image 30, a central image in an emission center of X-rays and peripheral images in peripheral parts away from the emission center are images corresponding to different incident angle directions of X-rays different from each other. To address this, in this embodiment, the central image 61b, which is cut out corresponding to the part 60b from the teacher X-ray image 60 including the solder balls 104 having a regular arrangement, and the end images 61c and 61d, which are cut out corresponding to the parts 60c and 60d different from the part 60b from the teacher X-ray image, are acquired. Because the solder balls 104 in the teacher X-ray image 60 are arranged in a regular arrangement, images of the solder balls 104 in the central image 61b and the end images 61c and 61d can be projection images corresponding to a structure having a common arrangement relation. Accordingly, the part 60b, and the parts 60c and 60d including images corresponding to different angle directions of X-rays incident on a structure having a common arrangement relation can be cut out from the teacher X-ray image 60 by acquiring the central image 61b and the end images 61c and 61d. For this reason, even in a case in which not the entire teacher X-ray image 60 but images that are cut out corresponding to parts of the teacher X-ray image are used, teacher data can be acquired to properly represent the entire projection image of the teacher X-ray image 60, and as a result it is possible to prevent accuracy reduction of discrimination result by the learned model 50 generated by machine learning. Therefore, it is possible to provide a learned model production method capable of reducing a burden on operators in teacher data production for producing a learned model 50 by using the central image 61b and the end images 61c and 61d cut out from the teacher X-ray image 60 while preventing accuracy reduction of discrimination result.

Modified Embodiment

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which input teacher data sets 30t are produced based on a central image 61b (first image) that is cut out corresponding to a part 60b (first part) including a central part of the target area 60a, and end images 61c and 61d (second images) that are cut out corresponding to parts 60c and 60d (second parts) each of which includes its corresponding end part of the target area 60a has been shown in the aforementioned embodiment, the present invention is not limited to this. In the present invention, input teacher data may be produced by acquiring a first image corresponding to a part other than a central part of a target area and a second image corresponding to a other than an end part of the target area.

Also, while the example in which a range of the part 60b (first part) and ranges of the parts 60c and part 60d (second parts) are automatically specified in accordance with an area-specifying instruction that specifies a target area 60a has been shown in the aforementioned embodiment, the present invention is not limited to this. In the present invention, ranges of the first and second parts may be separately and directly specified in accordance with area-specifying instructions that specify their corresponding one of the first and second parts.

Also, while the example in which a range of the part 60b (first part) or ranges of the parts 60c and part 60d (second parts) are specified (changed) in accordance with an input instruction has been shown in the aforementioned embodiment, the present invention is not limited to this. In the present invention, no change of one of or both ranges of the first and second parts may be accepted. In other words, when the target area 60*a* is specified, ranges of the first and second parts may be automatically specified, and the first and second images may be then cut out.

Also, while the example in which reproduced images are inversely placed in alignment when input teacher data sets 30*t* are adjusted to a common size has been shown in the aforementioned embodiment, the present invention is not limited to this. In the present invention, images may be placed in alignment without such inverse orientation change when input teacher data is produced.

Also, while the example in which a background image 61*e* corresponding to a cut-out background part 60*e* is acquired to produce a learned model 50 has been shown in the aforementioned embodiment, the present invention is not limited to this. In the present invention, input teacher data may be produced without using such as background image.

Also, while the example in which common ranges of the central image 61*b* (first image) and the end images 61*c* and 61*d* (second images) are acquired from a plurality of teacher X-ray images 60 in accordance with ranges that are specified in one teacher X-ray image 60 has been shown in the aforementioned embodiment, the present invention is not limited to this. In the present invention, in a plurality of teacher X-ray images, different ranges of their first image and different ranges of their second image may be acquired.

Also, while the example in which a learned model 50 is produced to extract areas of solder balls 104 (inspection targets, solder material pieces) in the central image 61*b* (first image) and the end images 61*c* and 61*d* (second images) has been shown in the aforementioned embodiment, the present invention is not limited to this. In the present invention, a learned model may be produced to detect an area of a defect part included in solder ball (inspection target, solder material piece). For example, the discrimination information acquirer may be configured to acquire as the discrimination information a discrimination image that detects an area of avoid (hole) as a defect part included in the solder ball. Also, a learned model may be produced to extract not areas of solder balls in BGA (Ball Grid Array) but areas of a plurality of solder material pieces in connection parts between a plurality of terminals in LGA (Land Grid Array) in which the terminals are arranged in a grid arrangement or an area of a defect part included in the plurality of solder material pieces. Also, a learned model may be produced to not areas of solder material pieces but area of terminals or an area of a defect part included in the terminals.

Also, while the example in which the cut-out image acquirer 43 is configured to acquire two parts 60*c* and 60*d* (second parts) having the same size has been shown in the aforementioned embodiment, the present invention is not limited to this. In the present invention, the cut-out image acquirer may be configured to acquire one second part. In a case in which two second parts are acquired, the cut-out image acquirer may be configured to acquire two second parts having different size from each other.

Also, while the image generator 13 configured to generate an X-ray image 30 (teacher X-ray image 60) is provided separately from the controller 21 (model producer) configured to produce a learned model 50 has been shown in the aforementioned embodiment, the present invention is not limited to this. In the present invention, a common control device may be configured to serve to generate the X-ray image and to produce the learned mode. Also, a control device configured to analyze X-ray images by using the learned model may be provided separately from the model producer configured to produce a learned model.

Modes

The aforementioned exemplary embodiment will be understood as concrete examples of the following modes by those skilled in the art.

(Mode Item 1)

An X-ray imaging system includes an X-ray emitter configured to emit X-rays to an inspection target having a regular arrangement; an X-ray detector configured to detect the X-rays emitted from the X-ray emitter; an image generator configured to generate an X-ray image based on the X-rays that are detected by the X-ray detector; and a model producer configured to produce a learned model for analysis of the X-ray image generated by the image generator, wherein the model producer includes a cut-out image acquirer configured to acquire a first image that is cut out corresponding to a first part from a teacher X-ray image including the inspection target having a regular arrangement, and a second image that is cut out corresponding to a second part different from the first part from the teacher X-ray image; a discrimination information acquirer configured to acquire discrimination information to discriminate at least one of an area of the inspection target in the first and second images, and an area of a defect part included in the inspection target in the first and second images; and a learning performer configured to perform machine learning for producing the learned model by using input teacher data sets based on the first and second images, and output teacher data sets based on the discrimination information.

(Mode Item 2)

The X-ray imaging system according to mode item 1, wherein the cut-out image acquirer is configured to acquire the first image which is cut out corresponding to the first part including a center part of a target area including the inspection target from the teacher X-ray image, and the second image which is cut out corresponding to the second part including an end part of the target area from the teacher X-ray.

(Mode Item 3)

The X-ray imaging system according to mode item 1 or 2, wherein the X-ray emitter is configured to emit X-rays to the inspection target which includes a plurality of solder material pieces arranged on a substrate in a grid arrangement as the regular arrangement; and the discrimination information acquirer is configured to acquire a discrimination image in which at least one of an area of the plurality of solder material pieces in the first and second images, and an area of a defect part included in the plurality of solder material pieces in the first and second images is discriminated as the discrimination information.

(Mode Item 4)

The X-ray imaging system according to any of mode items 1 to 3, wherein a user input acceptor configured to accept an user input instruction is further provided; the user input acceptor accepts an area-specifying instruction that specifies a target area including the inspection target in the teacher X-ray image; and the cut-out image acquirer automatically specifies a range of the first part and a range of the second part from the teacher X-ray image based on the target area in the teacher X-ray image specified by the area-specifying instruction accepted by the user input acceptor.

(Mode Item 5)

The X-ray imaging system according to any of mode items 1 to 4, wherein a display configured to display the teacher X-ray image, and a user input acceptor configured to accept an user input instruction are further provided; and the display visually displays an indication indicating a range of the first part to be cut out from the teacher X-ray image and an indication indicating a range of the second part to be cut out from the teacher X-ray image; and the cut-out image acquirer specifies the ranges of the first and second parts to be cut out from the teacher X-ray image based on the user input instruction accepted by the user input, (Mode Item 6)

The X-ray imaging system according to mode item 5, wherein the cut-out image acquirer specifies the ranges of the first and second parts which have a size not smaller than a predetermined threshold based on the user input instruction accepted by the user input acceptor.

(Mode Item 7)

The X-ray imaging system according to any of mode items 1 to 6, wherein the model producer further includes a teacher data producer configured to generate the input teacher data sets based on the first and second images acquired by the cut-out image acquirer; and the teacher data producer is configured to adjust the input teacher data sets to a common size by using at least one of an alignment in which a plurality of first images, which are produced by reproducing the first image, are placed in alignment, and an alignment in which a plurality of second images, which are produced by reproducing the second image, are placed in alignment.

(Mode Item 8)

The X-ray imaging system according to mode item 7, wherein the teacher data producer is configured to adjust the input teacher data sets to the common size by using at least one of an inverse alignment in which the first images are inversely placed in alignment, and an inverse alignment in which the second images are inversely placed in alignment (Mode Item 9)

The X-ray imaging system according to any of mode items 1 to 8, wherein the cut-out image acquirer acquires a background image corresponding to a background part cut out from the teacher X-ray image so as to exclude the inspection target; and the learning performer is configured to perform machine learning for producing a learned model by using the input teacher data sets based on the first and second images, and the background image.

(Mode Item 10)

The X-ray imaging system according to any of mode items 1 to 9, wherein a user input acceptor configured to accept an user input instruction is further provided; the user input acceptor accepts a range-specifying instruction specifying ranges of the first and second parts in one teacher X-ray image among a plurality of the teacher X-ray images; and the cut-out image acquirer acquires a plurality of first images corresponding to a common range of the first part, which is specified in accordance with the range-specifying instruction specified in the one teacher X-ray image, cut out from the plurality of teacher X-ray images, and a plurality of second images corresponding to a common range of the second part, which is specified in accordance with the range-specifying instruction specified in the one teacher X-ray image, cut out from the plurality of teacher X-ray images.

(Mode Item 11)

A learned model production method includes a step of acquiring a first image that is cut out corresponding to a first part from a teacher X-ray image corresponding to an X-ray image generated by irradiating an inspection target having a regular arrangement with X-rays, and a second image that is cut out corresponding to a second part different from the first part from the teacher X-ray image; a step of acquiring discrimination information to discriminate at least one of an area of the inspection target in the first and second images, and an area of a defect part included in the inspection target in the first and second images; and a step of performing machine learning for producing a learned model for analysis of the X-ray image by using input teacher data sets based on the first and second images, and output teacher data sets based on the discrimination information.

The invention claimed is:

1. An X-ray imaging system comprising:
   an X-ray emitter configured to emit X-rays to an inspection target having a regular arrangement;
   an X-ray detector configured to detect the X-rays emitted from the X-ray emitter;
   an image generator configured to generate an X-ray image based on the X-rays that are detected by the X-ray detector; and
   a model producer configured to produce a learned model for analysis of the X-ray image generated by the image generator, wherein
   the model producer includes
   a cut-out image acquirer configured to acquire a first image that is cut out corresponding to a first part from a teacher X-ray image including the inspection target having a regular arrangement, and a second image that is cut out corresponding to a second part different from the first part from the teacher X-ray image;
   a discrimination information acquirer configured to acquire discrimination information to discriminate at least one of an area of the inspection target in the first and second images, and an area of a defect part included in the inspection target in the first and second images; and
   a learning performer configured to perform machine learning for producing the learned model by using input teacher data sets based on the first and second images, and output teacher data sets based on the discrimination information.

2. The X-ray imaging system according to claim 1, wherein
   the cut-out image acquirer is configured to acquire the first image which is cut out corresponding to the first part including a center part of a target area including the inspection target from the teacher X-ray image, and the second image which is cut out corresponding to the second part including an end part of the target area from the teacher X-ray image.

3. The X-ray imaging system according to claim 1, wherein
   the X-ray emitter is configured to emit X-rays to the inspection target which includes a plurality of solder material pieces arranged on a substrate in a grid arrangement as the regular arrangement; and
   the discrimination information acquirer is configured to acquire a discrimination image in which at least one of an area of the plurality of solder material pieces in the first and second images, and an area of a defect part included in the plurality of solder material pieces in the first and second images is discriminated as the discrimination information.

4. The X-ray imaging system according to claim 1 further comprising a user input acceptor configured to accept an user input instruction, wherein the user input acceptor accepts an area-specifying instruction that specifies a target area including the inspection target in the teacher X-ray image; and the cut-out image acquirer automatically specifies a range of the first part and a range of the second part from the teacher X-ray image based on the target area in the teacher X-ray image specified by the area-specifying instruction accepted by the user input acceptor.

5. The X-ray imaging system according to claim 1 further comprising a display configured to display the teacher X-ray image, and a user input acceptor configured to accept an user input instruction, wherein the display visually displays an indication indicating a range of the first part to be cut out from the teacher X-ray image and an indication indicating a range of the second part to be cut out from the teacher X-ray image; and the cut-out image acquirer specifies the ranges of the first and second parts to be cut out from the teacher X-ray image based on the user input instruction accepted by the user input acceptor.

6. The X-ray imaging system according to claim 5, wherein the cut-out image acquirer specifies the ranges of the first and second parts which have a size not smaller than a predetermined threshold based on the user input instruction accepted by the user input acceptor.

7. The X-ray imaging system according to claim 1, wherein the model producer further includes a teacher data producer configured to generate the input teacher data sets based on the first and second images acquired by the cut-out image acquirer; and the teacher data producer is configured to adjust the input teacher data sets to a common size by using at least one of an alignment in which a plurality of first images, which are produced by reproducing the first image, are placed in alignment, and an alignment in which a plurality of second images, which are produced by reproducing the second image, are placed in alignment.

8. The X-ray imaging system according to claim 7, wherein the teacher data producer is configured to adjust the input teacher data sets to the common size by using at least one of an inverse alignment in which the first images are inversely placed in alignment, and an inverse alignment in which the second images are inversely placed in alignment.

9. The X-ray imaging system according to claim 1, wherein the cut-out image acquirer acquires a background image corresponding to a background part cut out from the teacher X-ray image so as to exclude the inspection target; and the learning performer is configured to perform machine learning for producing a learned model by using the input teacher data sets based on the first and second images, and the background image.

10. The X-ray imaging system according to claim 1 further comprising a user input acceptor configured to accept an user input instruction, wherein the user input acceptor accepts a range-specifying instruction specifying ranges of the first and second parts in one teacher X-ray image among a plurality of the teacher X-ray images; and the cut-out image acquirer acquires a plurality of first images corresponding to a common range of the first part, which is specified in accordance with the range-specifying instruction specified in the one teacher X-ray image, cut out from the plurality of teacher X-ray images, and a plurality of second images corresponding to a common range of the second part, which is specified in accordance with the range-specifying instruction specified in the one teacher X-ray image, cut out from the plurality of teacher X-ray images.

11. A learned model production method comprising:

a step of acquiring a first image that is cut out corresponding to a first part from a teacher X-ray image corresponding to an X-ray image generated by irradiating an inspection target having a regular arrangement with X-rays, and a second image that is cut out corresponding to a second part different from the first part from the teacher X-ray image;

a step of acquiring discrimination information to discriminate at least one of an area of the inspection target in the first and second images, and an area of a defect part included in the inspection target in the first and second images; and a step of performing machine learning for producing a learned model for analysis of the X-ray image by using input teacher data sets based on the first and second images, and output teacher data sets based on the discrimination information.

* * * * *